INVENTORS.
HARRY POCHAPSKY
BY WAYNE A. KRUPER

ATTORNEYS.

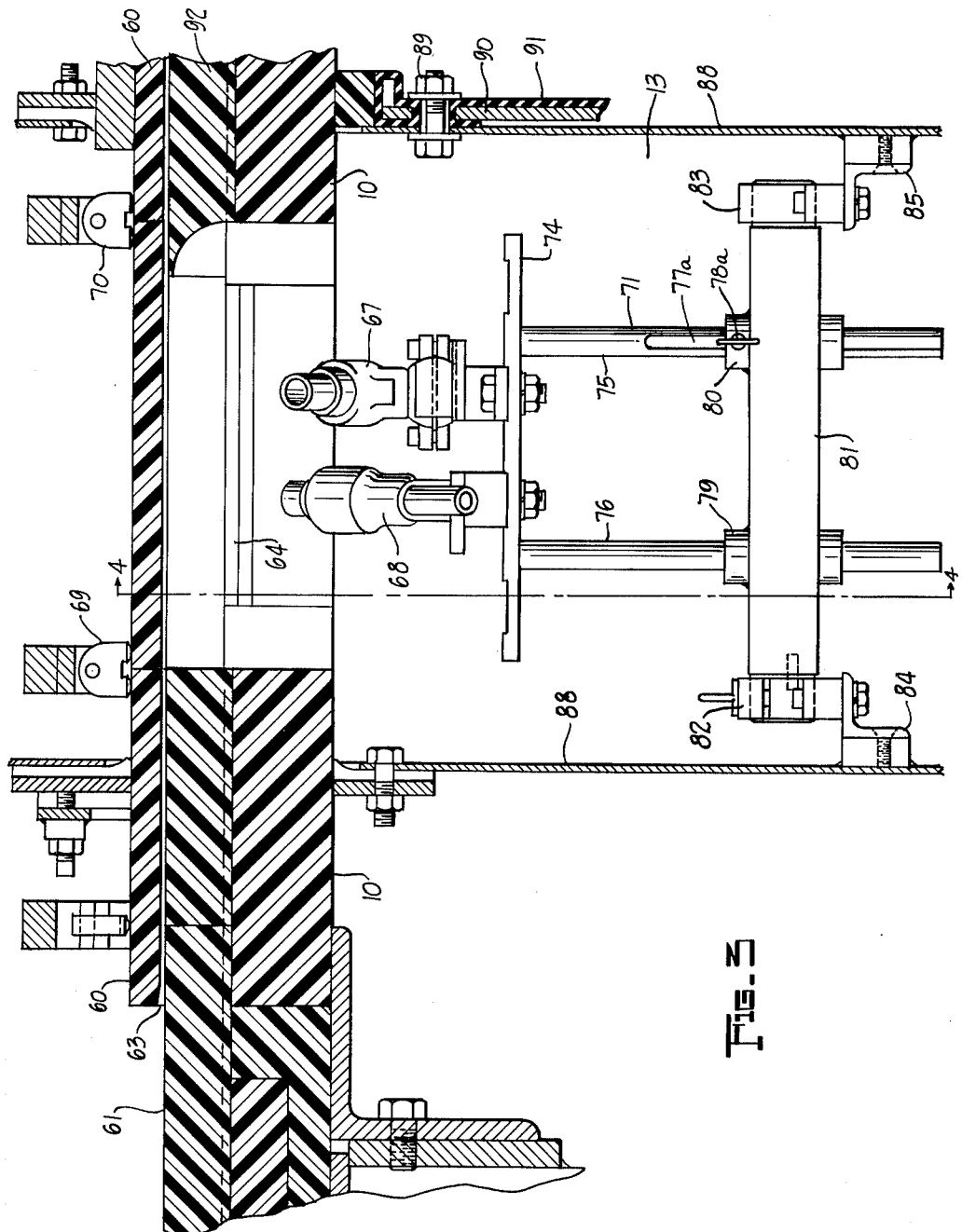

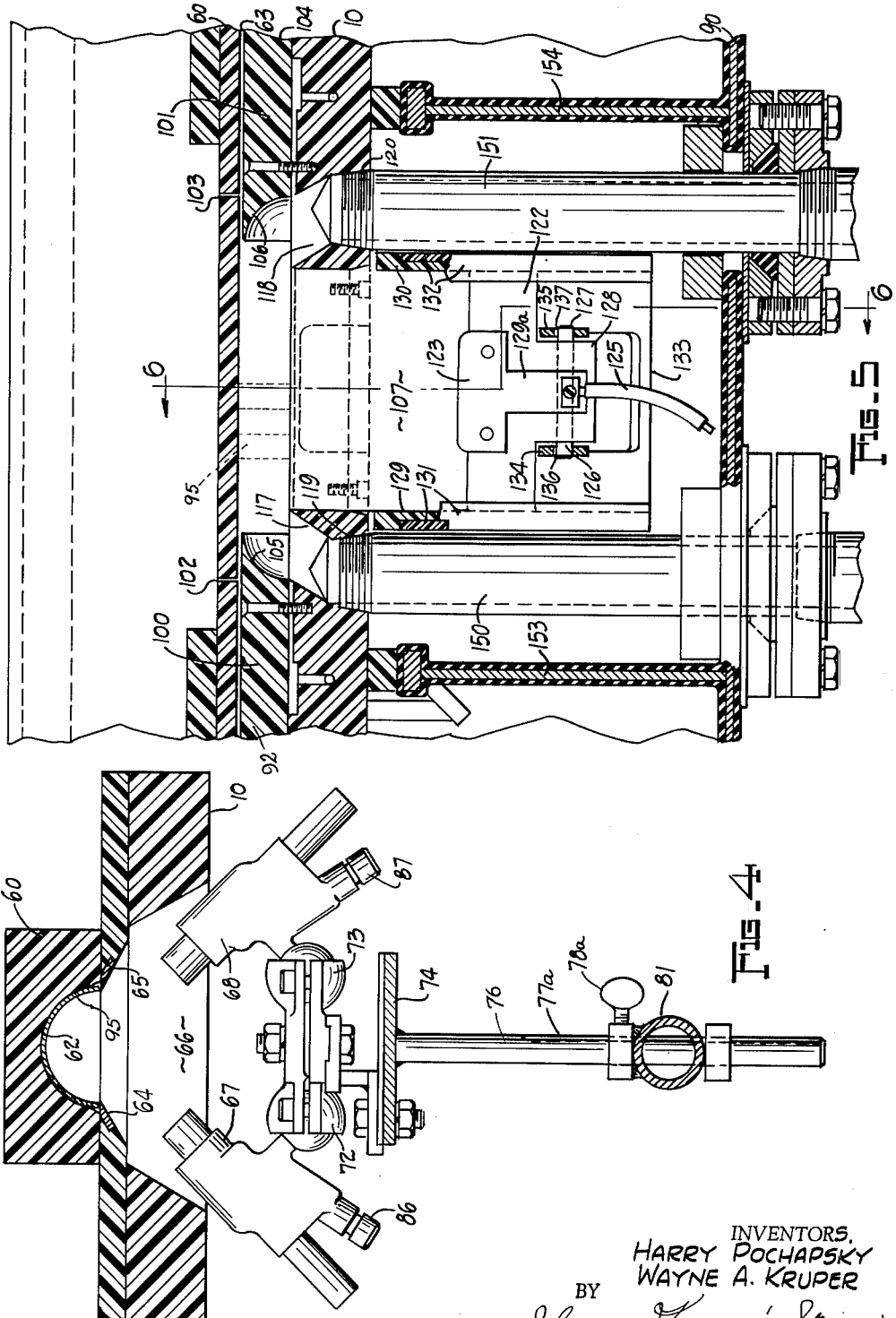

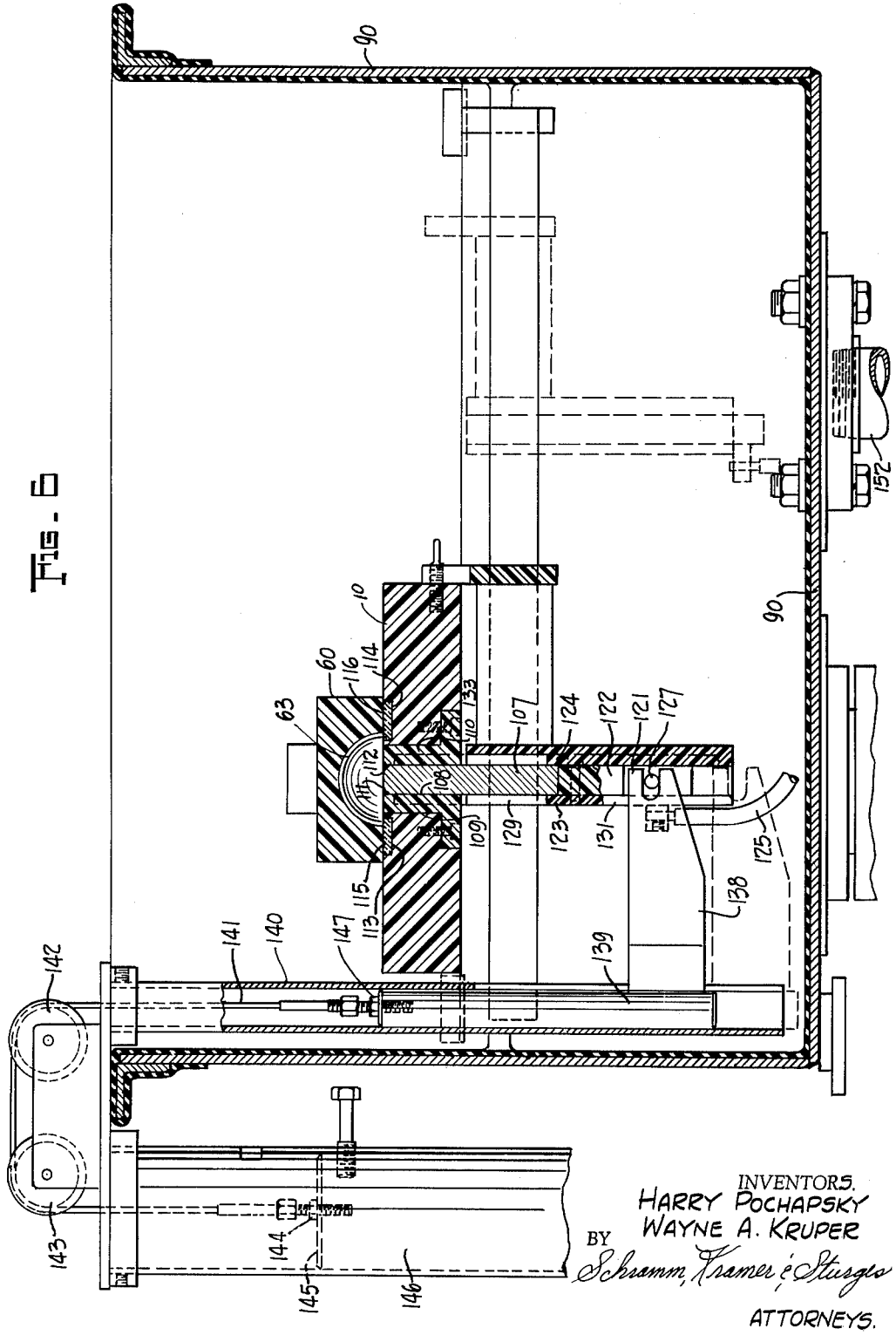

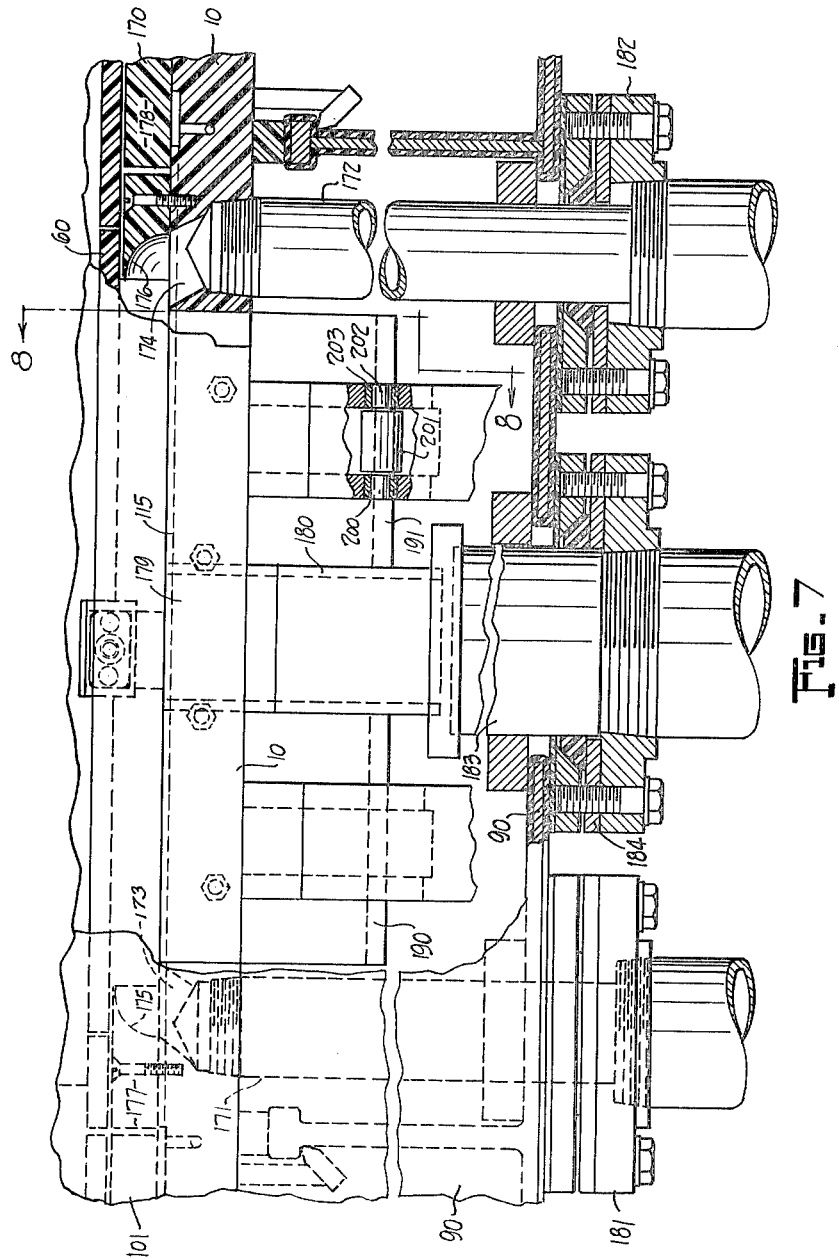

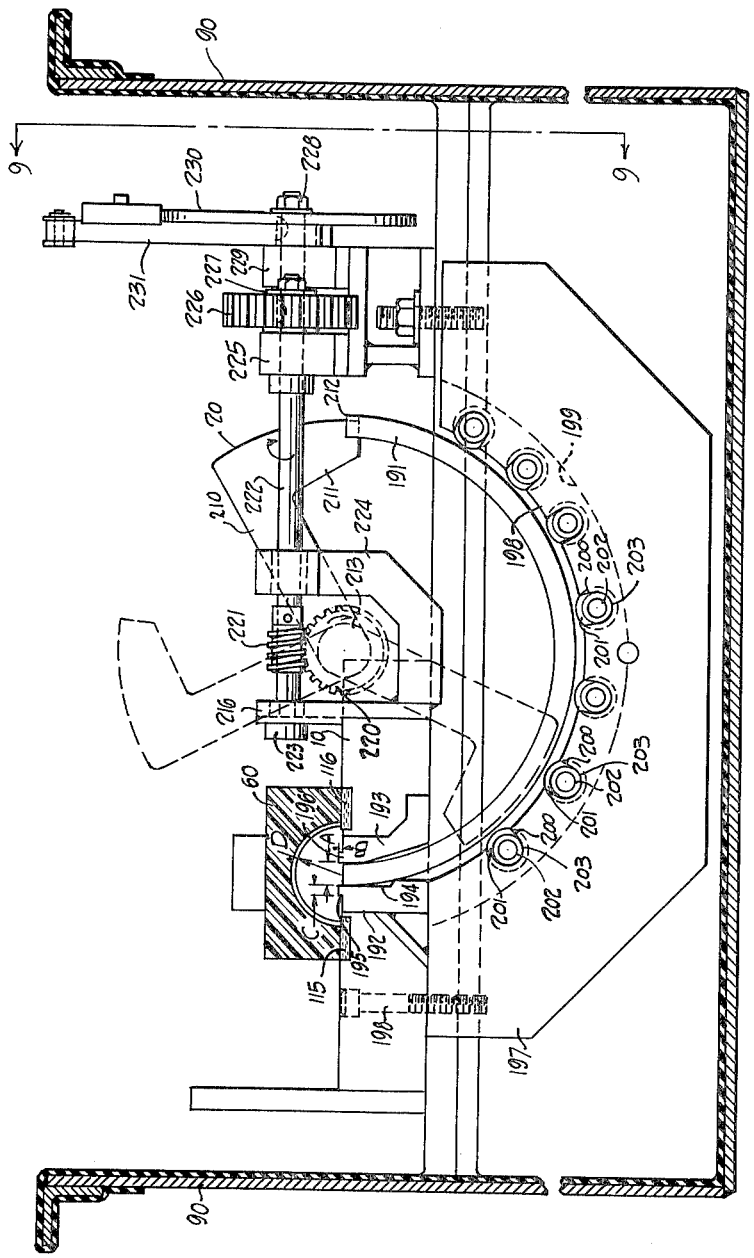

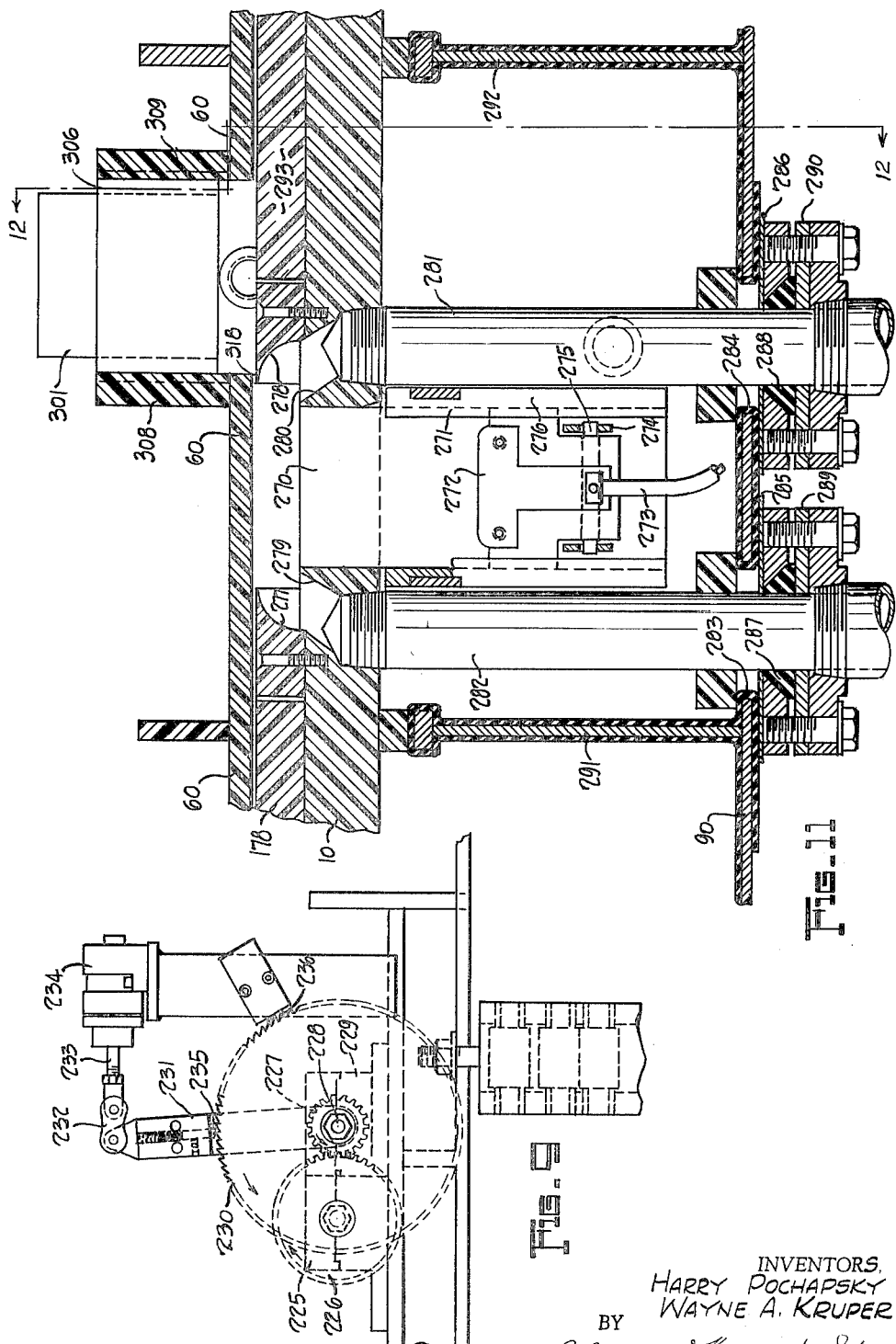

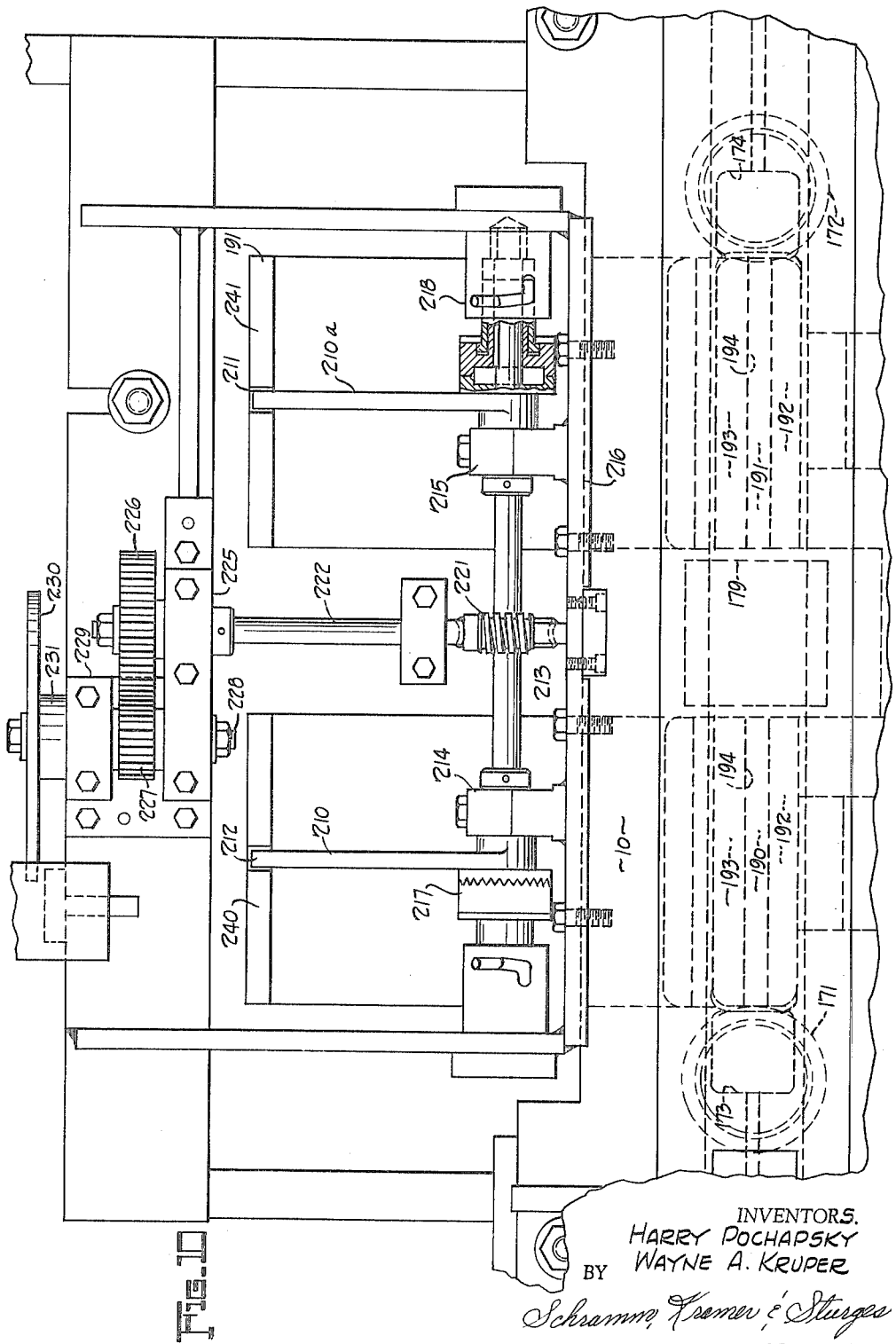

Dec. 28, 1965     H. POCHAPSKY ETAL     3,226,308
ELECTROCHEMICAL TREATING METHOD AND APPARATUS
Filed June 15, 1961     12 Sheets-Sheet 10

INVENTORS.
HARRY POCHAPSKY
WAYNE A. KRUPER
BY
Schramm, Kramer & Sturges
ATTORNEYS.

INVENTORS.
HARRY POCHAPSKY
BY WAYNE A. KRUPER

ATTORNEYS.

United States Patent Office 3,226,308
Patented Dec. 28, 1965

3,226,308
ELECTROCHEMICAL TREATING METHOD AND APPARATUS
Harry Pochapsky and Wayne A. Kruper, Willowick, Ohio, assignors to Clevite Corporation, a corporation of Ohio
Filed June 15, 1961, Ser. No. 117,457
17 Claims. (Cl. 204—26)

The invention relates as indicated to an electro-chemical treating apparatus and method for electrochemical treatment of articles of manufacture. The invention will be described with particular reference to the method and apparatus for electro-coating semi-cylindrical articles.

The provision of an electroplated coating on semi-cylindrical convexo-concave articles or work pieces has heretofore been accomplished primarily by providing a rack into which a plurality of such articles in abutting relationship have been stacked. The apparatus is so constructed as to permit the concave surface of the shell to be plated from an anode external to the rack. After the rack has been immersed in the electrolyte and exposed to the anode and under the influence of an electrical current for a sufficient period of time, the entire rack is moved through a series of operations to complete the plating operation. A characteristic difficulty with the procedures of the prior art has been the amount of time required to deposit a coating of metal of sufficient thickness for commercial purposes. For example, experience has shown that it required a period of about 20 minutes to deposit a coating of lead- and tin-containing alloy 1 mil thick. Moreover, where the electrolyte completely surrounds the article as with these prior art processes, considerable loss of alloy is experienced due to "back plating." Deposition of alloy on the back, or convex surface of bearing shells, for example, can be as high as 15% of the total alloy plated. In accordance with a method and apparatus of the present invention, alloy coatings of this same thickness may be deposited continuously on one surface in a period of about 30 seconds or less and with variations in thickness not exceeding 5%.

It has been found that by continuously moving the articles being plated with respect to the anode and by passing the electrolyte between the anode and the semi-cylindrical shells or work pieces while impressing turbulent flow conditions on the electrolyte, metallic surfaces can be continuously electrochemically treated, e.g. electroplated or electro-etched to provide substantially uniform results in a very short period of time. There has further been found apparatus in which bearing shells are continuously moved in abutting relationship with respect to the anode or anodes which apparatus is characterized by the presence therein of means for passing an electrolyte between the anode and the surface of the bearing half shells to be plated, i.e. concave or convex, under turbulent flow conditions. The bearing shells form a tunnel through which the electrolyte moves. This is of particular utility in enabling alloy coating of bearing half shells or semi-cylindrical bearings at a very high rate of speed. Continuous smooth movement in the anode confronting areas, as distinguished from discontinuous or intermittent movement, enables the deposition of coatings of improved uniformity. Corrosion of an elongated anode is not uniform, and movement of the articles continuously provides a means for averaging out the irregularities within the surface of a given piece and from piece to piece. It has further been found that uniformity of the alloy coating can be improved by minimizing the venturi effect in turbulently flowing streams of electrolyte, e.g. by flowing two streams toward each other from opposite ends of a line of abutting articles and removing the electrolyte from a point intermediate their respective origins. Turbulent flow will be understood as that velocity in feet per second which under the conditions of temperature, viscosity, and average diameter of the system which will yield a value for Reynolds number in excess of 2000. For most purposes, linear velocities of from 5 to 40 feet per second will be found practicable for most bearing diameters, e.g., 5" to 10" in diameter. It has been found also that current densities of as high as 1500 amperes per square foot may be obtained with the extremely turbulent conditions that linear velocities of the aforesaid magnitude provide. Generally, the higher the degree of turbulence in the flowing stream, the higher the current density which may be used.

The present invention will be illustrated with reference to apparatus especially adapted for the electroplating of semi-cylindrical bearing shells. It should be understood, however, that the apparatus is readily adaptable to the electrochemical treatment of surfaces of articles generally regardless of the ultimate use to which those articles are put or purposes for which they are so treated.

Briefly stated, this invention is in the provision of an apparatus and method for the continuous electrochemical treatment of articles of manufacture. The apparatus is characterized by an elongated track along which the articles are continuously moved and having at least one slot therein adapted to receive an electrode. The track is also adapted to carry the semi-cylindrical articles with their semi-circular edges in abutting relation and resting on their lateral edges so as to bridge the electrode slot and preferably form a closed semi-cylindrical chamber in combination with the table and the anode. Means are provided for pumping an electrolyte between the electrode and the articles and for impressing turbulent flow conditions on the electrolyte. In a preferred embodiment, a pair of electrolyte streams are propelled toward each other from opposite ends of a section of abutting semi-cylindrical articles being plated and exhausted from a point intermediate the ends. When a direct electrical current is applied at current densities in excess of 100 amperes per square foot, e.g. up to 1500 a.s.f., the semi-cylindrical articles may be plated with anode material at an extremely high rate of speed.

The apparatus also includes means for feeding the semi-cylindrical articles progressively to and along the track. While it is contemplated that an apparatus may consist of those parts sufficiently only to enable specified electrochemical treatment of the work pieces, in the more specific embodiments of the present invention, a number of electrochemical plating operations leading to the production of commercially acceptable semi-cylindrical bearings are conveniently performed in a single apparatus as more particularly described hereinafter.

The improved process of the present invention is directed in general to a method of electrochemical treatment of a work piece surface which comprises moving a work piece in spaced relation to an electrode. Simultaneously therewith, an electrolyte is passed through the space between the work piece and the electrode. The electrolyte is continuously moved with respect to both anode and cathode as, for example, by impressing turbulent flow conditions thereon as it passes through the space. A direct current is passed between the work piece and the electrode in accordance with the desired electrochemical treatment.

Briefly, however, the process insofar as it relates to bearings involves the treatment of semi-cylindrical steel bearing shells having a bronze concave facing thereon. The bronze faced steel shells after proper gauging as to size are fed to any suitable device for aligning them in abutting relationship. The bronze coating may also be applied by electroplating procedures. Prior to plating, it is desirable to remove from the bronze surface any dirt or grease which may have accumulated in prior operations. This can be done by any suitable degreasing means. To remove oxides and solvent insoluble particles, we have found it desirable to use a vapor blast cleaning operation wherein a slurry of minute glass beads or silica particles suspended in a suitable liquid medium, e.g. water, is impinged upon the concave surface of the lined steel half shells. Satisfactory cleaning is obtained by this method very quickly and with minimum difficulty and handling requirements. Thereafter, the shells are submitted to a rinsing operation.

In order to prevent diffusion of alloy components later to be applied into the bronze layer, an anti-diffusion flash coating is conveniently applied. This coating may vary from 30 to 100 millionths of an inch and may be composed of nickel, copper, cobalt, or the like. This coating is applied by electroplating means, following which the semi-cylindrical bearing shells containing the diffusion barrier are again submitted to a rinsing operation using water as the rinsing material. The bearings then enter the section wherein the alloy material is applied by electroplating means as hereinafter more particularly described, and again rinsed. Then, if desired, both the convex and the concave surfaces of the bearings may be given an additional flash coating varying in thickness from 30 to 70 millionths of an inch to improve the properties of the bearing such as the appearance and shelf life of the final product. After rinsing the bearings, the completed bearings are passed through a drying oven, submitted to inspection and gauging, and finally packed for delivery to the point of ultimate use.

In the annexed drawings:

FIG. 3 is a cross-section of one form of apparatus in accordance herewith showing the details of a cleaning portion thereof.

FIG. 4 is a cross-section taken on line 4—4 of FIG. 3.

FIG. 5 is a cross-section of one form of apparatus in accordance herewith showing a diffusion-barrier flash section.

FIG. 6 is a cross-section taken on the line 6—6 of FIG. 5.

FIG. 7 is a cross-section of one form of apparatus in accordance herewith showing the details of an alloy plating section.

FIG. 8 is a cross-section taken on the line 8—8 of FIG. 7.

FIG. 9 is a cross-section taken on the line 9—9 of FIG. 8.

FIG. 10 is a top view of one form of an apparatus in accordance with this invention showing the details of a preferred alloy anode feeder.

FIG. 11 is a cross-section of one form of apparatus in accordance herewith showing the details of a section in which flashing of the concave and convex sections respectively of a semi-circular article is accomplished.

Figure 1:
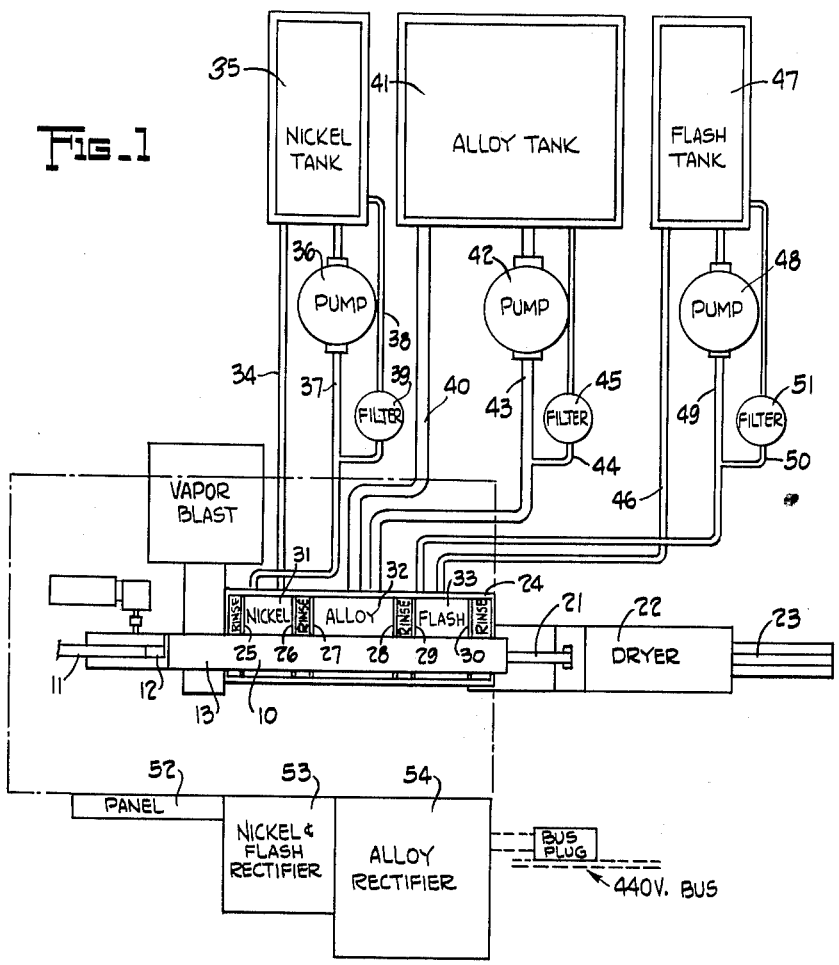
FIG. 1 is a diagrammatic and schematic layout of an inline plating apparatus in accordance with the present invention.
Figure 2:
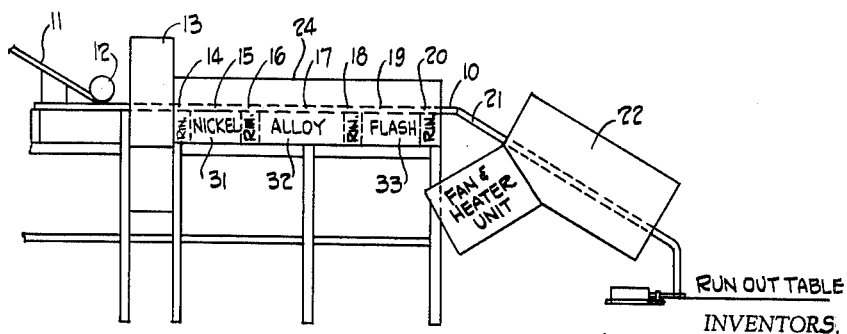
FIG. 2 is a side elevation of the apparatus shown in FIG. 1.
Figure 13:
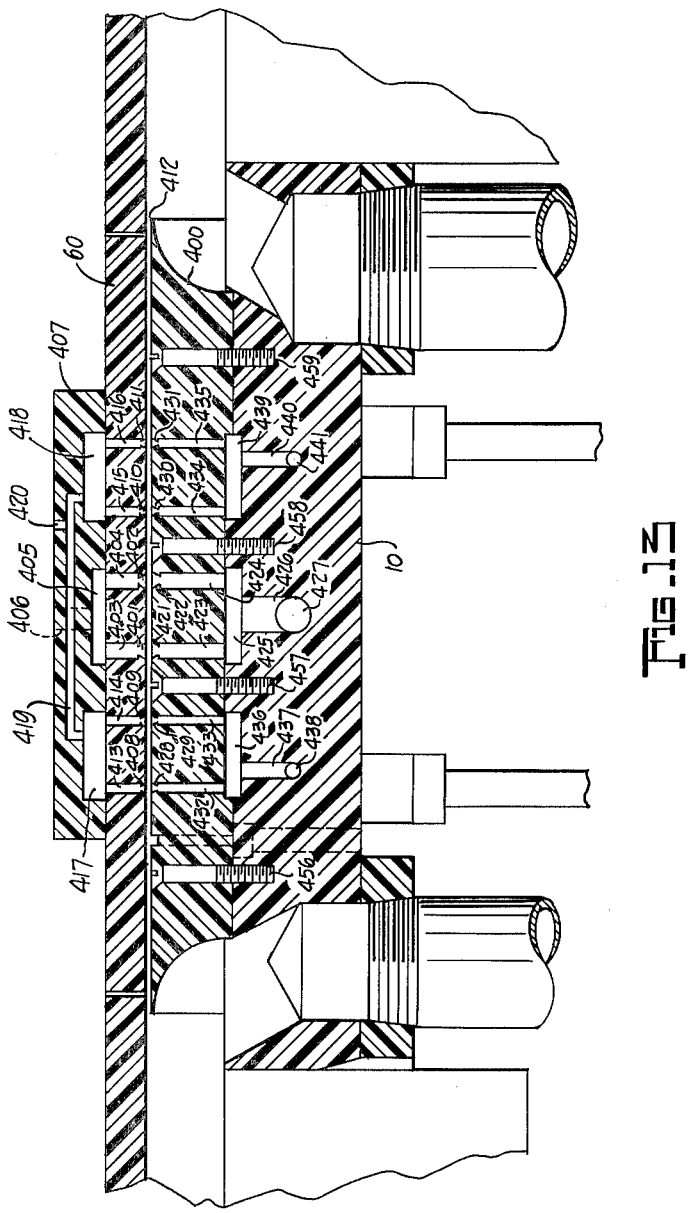
FIG. 13 is a cross-section showing the details of a typical washing or rinsing section in an apparatus in accordance herewith.

Referring now more particularly to FIG. 1, and FIG. 2, there is shown in diagrammatic and schematic form a layout for an inline continuous bearing plating apparatus in accordance herewith together with auxiliary equipment useful therewith. Various operations within the present invention are performed upon semi-cylindrical articles e.g. bearing half shells, which are carried upon an elongated track 10. The inlet end of the track, or the left end as shown in FIG. 1 is provided with a chute 11 upon which the semi-cylindrical articles are arranged in abutting relationship. Feeding wheel 12 which is conveniently a relatively soft rubber pneumatic wheel serves to push the aligned semi-cylindrical shells along the track 10 at a uniform rate, for example 2 feet per minute. In a specific embodiment of this invention, the first operation encountered by the semi-cylindrical shells is a cleaning operation. The cleaning operation is performed in a blast chamber 13, wherein the concave surfaces of the semi-cylindrical articles are blasted with a high speed vapor containing minute glass beads or silica particles. The cleaning operation is performed without bearings leaving the track 10. In response to the continuous driving force of the wheel 12, the semi-cylindrical articles then enter a rinsing section 14. A typical cross-section of a track in accordance herewith adapted for performing the rinsing operation is shown in FIG. 13 in detail.

The bearing shells which, in a preferred embodiment, are negatively charged by direct contact with copper bars in a plating section hereinafter described, are then propelled to a diffusion barrier flashing section 15 and another rinse section 16. Details of one form of the flash section of an apparatus in accordance herewith are shown in FIGS. 5 and 6. The next section encountered by the semi-cylindrical articles is an alloy plating section 17 and a rinsing section 18 adjacent thereto. Details of the alloy plating section are shown in FIGS. 7, 8, 9 and 10. The articles then proceed into a final plating section 19 to receive a finishing flash coating and the associated rinsing section 20. The rinsing sections 14, 16 and 18 and 20 are all substantially the same, and the details therefor may be found in FIG. 13. Upon leaving the track 10, the semi-cylindrical articles enter a chute 21 and pass through a dryer 22. From the dryer 22, the semi-cylindrical articles are conducted by means of chute 23 to a run-out table or any other convenient receptacle for inspection and packing.

The track 10 passes through a compartment tank 24 containing dividers 25, 26, 27, 28, 29 and 30 for collecting and isolating rinse water and the various electrolytes, hereinafter more particularly described. Chamber 31 is adapted to contain the electrolyte leakage which may be associated with the deposition of a diffusion barrier, e.g. nickel. Electrolyte leaves the section 15 through the pipe 34 and is returned to the storage tank 35. If any adjustment is necessary in the composition of the electrolyte, suitable additions of the necessary ingredients may be made in the tank 35. Fresh electrolyte is pumped by means of pump 36 through the line 37. It is by means of the pump 36 that the electrolyte is forced under turbulent flow conditions between the anode and the concave surface of the semi-cylindrical articles being plated. If desired, a by-pass line 38 containing a filter 39 may be placed in the line to aid in maintaining the electrolyte free of suspended solid matter. In a specific example, the nickel electrolyte tank has a capacity of 200 gallons, and the pump 36 has a capacity of 200 gallons per minute.

Chamber 32 is adapted to contain and collect the overflow electrolyte used in the deposition of the alloy coating to the concave surface of the semi-cylindrical articles. Return line 40 leads from the section 17 to the electrolyte storage tank 41. In tank 41, the concentration of the various chemical ingredients hereinafter more particularly described may be adjusted as necessary during the electroplating process. Pump 42 conducts the electrolyte from tank 41 through line 43 and forces the electrolyte by conduit means hereinafter more particularly shown in FIGS. 7, 8, 9 and 10 between the alloy anode and the concave surface of the semi-cylindrical articles. As in the case of the diffusion barrier electrolyte system, there may be provided a by-pass line 44 and a filter 45 for the purpose of removing from the electrolyte any suspended material. In a specific example, the alloy electrolyte tank 41 has a capacity of 500 gallons, and the pump 42 has a capacity of 350 gallons per minute.

Chamber 33 is adapted to retain the overflow electrolyte used in providing a flash coating of a single metal or a plurality of metals on the concave and convex surfaces of the semi-cylindrical articles being plated. Details of this section of the apparatus will be found in FIGS. 11 and 12. In a manner similar to the nickel electrolyte system, there is provided a return line 46 leading from the tank 33 to the storage tank 47 where adjustments in the chemical constitution of the electrolyte may be made if necessary. Electrolyte from the tank 47 is forced by means of pump 48 through the line 49 and forced between the anode and the semi-cylindrical article under turbulent flow conditions. In a manner similar to the other electrolyte systems, there may also be provided if desired, a by-pass line 50 and a filter 51 for removing suspended material from the electrolyte and aiding in the maintenance of a clean plating solution. Pump 48, like pump 36, is rated at 200 gallons per minute capacity.

There is also shown in FIG. 1 a convenient arrangement for a control panel 52, a generator and rectifier system 53 for the diffusion barrier and concave and convex surface flash plating operations, and a generator and rectifier system 54 for the alloy plating section of the apparatus. The diffusion barrier and flashing coating electrical system in a specific embodiment is adapted to run at a capacity of 500 amps. at 30 volts, and the alloy generator and rectifier system is rated at a capacity of 1500 amps. and 50.

*Cleaning apparatus*

FIGS. 3 and 4 show in detail elements constituting a cleaning section in a preferred specific embodiment of an apparatus in accordance with the present invention. A portion of the track end is shown, the left hand end of which as shown in FIG. 3 constitutes a continuation of the track portion from the feeding mechanism 12. The track 10 may be formed of any convenient material which is sufficiently rigid and preferably non-conducting to support the semi-cylindrical articles being processed. We have found that a homopolymer of vinyl chloride is particularly suited for a material of construction of the track 10. Superimposed upon the track 10 are guide means for maintaining the semi-cylindrical articles in proper alignment and abutting relationship. Principal components of the guide means are a tunnel member 60 and a core member 61. The tunnel member 60 has a substantially semi-circular configuration as shown at 62, a few thousandths larger in diameter than the O.D. of the semi-cylindrical articles, e.g. bearing half shells; and the core member 61 has a semi-cylindrical configuration a few thousandths smaller in diameter than the I.D. of the semi-cylindrical articles. When the member 60 and 61 are in superimposed relation to the track as shown in FIG. 3, they define a semi-annular space 63 through which the semi-circular articles are driven by any suitable driving means, such as wheel driving means 12 shown in FIG. 1. The tunnel 60 and the core 61 are conveniently formed of plastic materials, the core 61 being preferably formed of glass fiber reinforced polyglycidyl ether resin, and the tunnel 60 being desirably formed of a clear plastic, such as, polystyrene or polymethylmethacrylate to enable visibility of the line as it passes through the apparatus. Support means 64 and 65 are disposed on opposite sides of a wide longitudinal slot 66 in the track 10 to provide supports for the edges of the semi-cylindrical articles as they pass through the cleaning section shown in FIGS. 3 and 4. Supports 64 and 65 must be formed of an abrasive resistant material in order to withstand the abrasive effect of particles emanating from spray guns 67 and 68 and have their lower edges beveled to minimize deflection of the cleaning medium issuing from guns 67 and 68. More than two spray guns may be used if desired. As indicated above, we prefer to use a slurry of very minute silica particles suspended in an aqueous medium such as are commercially available and propelled by an air stream. This so-called "vapor blast" is directed toward the inner surface of the semi-cylindrical articles to be plated.

In the arrangement shown in FIGS. 3 and 4, cleaning is accomplished over a travel of about 6 inches in about 15 seconds time. It has been found that the vapor blast cleaning method is to be preferred since it avoids the problems connected with acid pickling operations. It will be noted that the core member 61 which would otherwise shield the concave surface, is discontinued in the area in which the vapor blast cleaning occurs. Suitable hold down means such as brackets 69 and 70 are desirably provided to maintain tunnel member 60 in place.

Guns 67 and 68 are of conventional design and conveniently mounted by any suitable means 71 within the chamber 13. Since maximum efficiency of cleaning of the surfaces to be plated is desirable, the position of the vapor blast spray guns 67 and 68 relative to the semi-cylindrical articles is important. Accordingly, in the embodiment shown in FIGS. 3 and 4, guns 67 and 68 are clamped by ball and socket means 72 and 73, respectively, to permit adjustment of the gun position. The ball and socket clamping means are in turn supported on a table 74 which is supported on legs 76 and 76, respectively. Vertical adjustment of the height of table 74 is obtained by means of key-way 77 in leg 76 and set screw 78. A similar key-way 77a and set-screw 78a is provided in leg 75. To obtain proper angular displacement of the table 74 with respect to the table 10, legs 75 and 76 are passed through collars 79 and 80 secured to tubular shaft 81 journaled for rotation about its longitudinal axis in supports 82 and 83 respectively, which are in turn secured to the walls of the chamber 13 by suitable brackets 84 and 85. Maximum adjustability of the position of guns 67 and 68 is thus obtained.

It should be noted that the slot 66 in the track 10 in the cleaning section of the apparatus is widened to accommodate the spray guns 67 and 68.

The spent slurry is permitted to fall freely back into the vapor blast chamber 13, and is collected at the bottom thereof and returned to conventional pumping and feeding means, not shown, for conducting the slurry back to spray guns 67 and 68 through slurry inlets 86 and 87, respectively.

Since no corosive materials are involved in the vapor blast chamber 13, selection of a suitable material of construction poses no problem. Thus, a steel chamber body 88 may be provided for this purpose. As shown in FIG. 3, the body 88 is conveniently affixed as by bolt means 89 to the main plating tank 90 which is preferably a rubber-clad steel body having a rubber coating 91 thereon.

Following the section of the apparatus wherein the surface of the semi-cylindrical articles is prepared for electroplating, the articles are submitted to a washing operation to remove any particulate material which may have been loosened and remained during the cleaning operation. The details of the washing apparatus are shown in FIG. 13 and will be explained in detail at a later point in this specification.

*Diffusion-barrier plating apparatus*

FIG. 5 is a longitudinal section through the track 10 at the point where the diffusion-barrier flash coating is applied to the semi-cylindrical articles moving therealong. We prefer to use nickel, although other diffusion-barrier metals may be used. Accordingly, nickel will be used as a specific example in the following discussion. The nickel flash operation is preceded and followed by a wash or rinse step. FIG. 5 shows the termination of the details of th erinsing section 100 and a portion of the details of the post-nickel flash rinsing section 101. Core member 92 is a continuation of core member 92 partially shown in FIG. 3. Tunnel member 60 shown in FIG. 5 is a continuation of tunnel member 60 shown in FIG. 3 and is conveniently split at 102 and 103 for easy removal and cleaning of the apparatus at this point. Core member 104 has substantially the same configuration as core member 92, more clearly detailed in FIG. 13. The clearance 63 is a continuation of the same clearance shown in FIG. 3 and is adapted to receive the semi-circular articles for plating. Core member 92 is not continuous with core member 104, but instead is spaced therefrom so that the concave surfaces of the negatively charged semi-cylindrical articles traversing the track 10 are exposed to the action of the diffusion-barrier anode and the electrolyte. Because the convex surfaces are maintained substantially free of electrolyte and because of the arrangement of the articles in the apparatus, little or no back-plating is permitted to occur. The exit end of washing section 100 is shaped to provide a deflector 105 to aid in directing the flow of electrolyte between the nickel anode 107 and the semi-cylindrical articles carried by the track 10. In like manner, the entrance end of rinsing section 101 is also shaped to provide a deflector 106, to aid in directing the flow of the electrolyte out of this section of the apparatus. Opposing streams of electrolyte may be used in this section if desired, but are not here essential, because of the extreme thin section of the coaing applied for anti-diffusion purposes.

Referring now to FIG. 6 in conjunction with FIG. 5, the track 10 is provided with a slot 108 extending longitudinally of the track and centrally disposed therein. The slot 108 is adapted to receive the nickel anode 107. In a preferred embodiment, the slot 108 is defined by shoulder pieces 109 and 110 defining the lateral marginal edges thereof and provided with lips 111 and 112. Lips 111 and 112 are important to control the nature of the electrolytic deposition from the nickel anode, by controlling its upward extension into the electrolyte cavity.

Track 10 is also provided with suitable recesses 113 and 114 adapted to receive longitudinal glass strips 115 and 116 upon which the edges of the semi-cylindrical articles to be plated are moved in sliding contact. Glass is a preferred material for these ways 115 and 116 for the reason that it is a non-conductor and also resistant to wear from the oftentimes sharp edges of the semi-cylindrical articles being plated.

Track 10 is also provided with apertures 117 and 118, threaded at their lower ends 119 and 120, respectively, to receive standard pipe threads. The openings 117 and 118 in combination with the deflectors 105 and 106 serve to guide the electrolyte between the anode and the articles being plated.

As the electroplating operation proceeds, nickel from the anode 107 is deposited upon the concave surface of the semi-cylindrical articles being plated. Means generally indicated at 121 are provided for advancing the anode 107 into the slot 108 to a distance which is determined by lips 111 and 112.

In the specific embodiment shown in FIGS. 5 and 6, nickel anode 107 is preferably a piece of pure or substantially pure nickel 6 inches wide, ¾ of an inch thick and of any suitable length. Slot 108 in track 10 is so proportioned as to accept anode 107 which in combination with lips 111 and 112 provides minimum loss of electrolyte by seepage. It is convenient to use a "depolarized" nickel in which the nickel anode contains a small amount of nickel oxide. Nickel anode 107 is supported on support block 122 provided with clamping jaws 123 and 124 adapted to rigidly retain the anode 107 and to conduct electrical current through the anode 107. An extension 129a of the jaw 123 is adapted to receive the terminal 125 which is in turn connected to the nickel rectifier and generator assembly 53 shown in FIG. 1. Support block 122 is conveniently provided with lateral lugs 126 and 127 in a depending portion 128 thereof. For this purpose, a stainless steel pin passing through the depending portion 128 may be used.

Support block 122 is slidably mounted in guide member 133, which is conveniently made from a homopolymer of vinyl chloride, and which is conveniently provided with side slide rails 129 and 130 having flanges 131 and 132 thereon to define a guide within which the nickel anode and its support 122 are free to move in a vertical direction.

The force necessary to maintain the anode 127 at its maximum penetration in the slot 108 is supplied by means of the mechanism more clearly shown in FIG. 6, it being understood that any suitable means for advancing the anode 107 may be employed instead of that specifically shown. In the specific embodiment illustrated, support member 122, and its depending portion 128, is supported in a pair of slotted tines 134 and 135 of clevis 138 having slots 136 and 137 therein adapted to receive lugs 126 and 127 respectively. Clevis 138 is attached to a piston 139 carried in slotted cylinder 140. A suitable cable 141 is attached to piston 139 by any suitable means such as that generally shown at 147. Cable 141 passes over pulleys 142 and 143 and attached by any suitable means generally shown at 144 and its free end to a counter-weight 145. Guide means 146 are provided for the counter-weight 145 and permit vertical movement thereof. Thus, as the nickel anode 107 is gradually corroded by the electrolytic action, the effect of the counter-weight 145 is to force the support 122 carrying anode 107 upwardly into slot 108.

Electrolyte is pumped under tubulent flow conditions through inlet pipe 150 so as to provide a linear velocity of from 5 to 40 feet per second in the space between the work piece and anode and exhausted from the system through outlet pipe 151. Inlet pipe 150 is the continuation of line 37 shown in FIG. 1, and outlet pipe 151 is the continuation of line 34 shown in FIG. 1. During the course of operation, some leakage of electrolyte may be experienced in the space between the slot 108 and anode 107. This may be collected in the main body of tank 90 and drained therefrom by means of drain 152 in the bottom thereof. Such overflow is returned to the nickel electrolyte tank 35 as shown in FIG. 1. Dividers 153 and 154 are provided in the tank 90 to confine the nickel plating bath to this section of the apparatus and also to provide a support means for the track 10. Dividers 153 and 154 and tank 90 are, as indicated above, desirably lined with a chemically resistant material, such as rubber.

*Alloy plating apparatus*

FIGS. 7 and 8 show the details of one form of apparatus in accordance herewith which is especially adapted for the application of an alloy coating to the concave surfaces of semi-cylindrical articles. FIGS. 9 and 10 show the details of an electrode advancing mechanism which may be used in accordance herewith.

Referring now more particularly to FIG. 7, the semi-cylindrical articles being plated proceed from left to right as with the previous figures. FIG. 8 is taken on the line 8—8 of FIG. 7.

FIG. 7 is a fragmentary front elevation of the alloy plating section of an apparatus in accordance herewith showing in progressively cut-away sections, the main tank 90, the interior details of the track 10, and a cut-away section through the track 10 showing the details of electrolyte inlet means.

In dotted lines there is shown the inclusion of a rinsing section 101, which is the rinsing section partially shown in FIG. 5. At the opposite end of the section shown in FIG. 7 there is also provided a rinsing section 170 partially shown. Since all of the rinsing sections in the embodiment shown in the annexed drawings are substantially the same in structure, these have been illustrated in FIG. 13. The details of construction will be explained later. The continuation of tunnel member 60 is also shown and as in previous sections, tunnel member 60 is formed so that a portion thereof may be easily removed for cleaning purposes. In the portion of the section shown in FIG. 7 wherein electroplating takes place, there is no core member which would, of course, interfere with the deposition of a plated coating on the concave surface of the semi-cylindrical articles being coated. In FIG. 8 there are shown the continuations of the glass ways 115 and 116 upon which the edges of the semi-cylindrical articles are supported and along which such articles slide in response to the driving force applied to the column of articles.

As has been previously indicated, the achievement of the extremely high current density utilized in a preferred embodiment of the invention, is made possible by passing the electrolyte between the anode and the cathode at a high rate of speed such that the flow conditions prevailing are turbulent and providing the means for effecting such flow in the apparatus hereof. Where the confronting distance between the articles being plated and the anode is short, and the thickness of the coating is of the magnitude of the flash coatings herein described, e.g. 30–100 millionths of an inch, special precautions with respect to the flowing electrolyte and attendant structural variations are not essential. However, where the longitudinal confronting distance between the negatively charged semi-cylindrical articles being plated, and the positively charged anodes is greater, e.g. more than 6 inches, for example in the specific embodiment herein described, 12 inches, the total path to be traveled by turbulently flowing electrolyte in combination with the thickness of the deposition which is to be made is sufficient to permit a venturi effect to occur within the flowing body of fluid to form a throat therein such that external air is drawn into the system. If such does occur, it has been found that plating above throat area is uneven causing intolerable thickness variations in the final product. In order to overcome this problem, we have found it desirable to feed electrolyte from opposite ends of the anode confronting portion in the alloy plating section, and withdrawing electrolyte from a point intermediate, e.g. centrally disposed between the opposing electrolyte inlets. In this way, the distance traveled by the electrolyte is reduced by one-half so that opportunity for formation of a venturi is substantially eliminated since the turbulently flowing stream of electrolyte is withdrawn from the confronting area before opportunity for formation of a "throat" is provided.

From a structural point of view, it has been found convenient to provide two alloy anodes 190 and 191 disposed on opposite sides of an outlet 179 for the electrolyte. Thus, in a preferred embodiment the electrolyte flowing between the semi-cylindrical articles being plated and anode 190 flows from left to right; the electrolyte flowing between the articles being plated and anode 191 flows from right to left; both streams exit through outlet 179. If desired, the connections to the pumping and draining means may be reversed so that the electrolyte is introduced through slot 179 and removed from the confronting sections disposed on either side thereof by means of outlets 173 and 174, respectively. A centrally located deflector disposed above opening 179 having deflection surfaces facing in opposite directions for guiding the streams to the outer deflectors 175 and 176, respectively, would then be provided.

As in the case of the nickel flash section of the apparatus previously described, electrolyte is continuously supplied and moved between the anode and the cathode, and has impressed thereon turbulent flow conditions, e.g. a linear velocity of from 5 to 40 feet per second through a column of shells 2.3″ in diameter. Thus, in FIG. 7 there is shown a first inlet pipe 171, and a second inlet pipe 172 threadedly engaged in track 10 and communicating with apertures 173 and 174 extending therethrough. Deflectors 175 and 176 are provided in the core members 177 and 178, respectively, to direct the flow of electrolyte into the cavity defined by the tunnel 60 and the semi-cylindrical articles moving therethrough in abutting relation. The inlet lines 171 and 172 are spaced apart, and in a specific form of the apparatus the distance is about 18 inches. An outlet slot 179 provided in the track 10 communicating with a conduit 180 conducts the spent electrolyte through the bottom of the tank 90 and communicates with return line 40 as shown in FIG. 1.

Inlet lines 171 and 172 also pass through the bottom of main tank 90 with suitable fittings to prevent leakage, generally shown at 181 and 182. Likewise suitable packing means are provided for the passage of the continuation 183 of outlet pipe 180, such packing means being generally shown at 184. Inlet lines 171 and 172 communicate with line 43 shown in FIG. 1.

In a preferred embodiment of the present invention, the alloy plating section shown in FIG. 7 is provided with two consumable anodes, 190 and 191. A single anode may be used, if desired, or an insoluble anode in combination with an electrolyte containing metal ions may be used. In the embodiment illustrated in FIGS. 7, 8, 9 and 10 the details of anode 191 which are the same as those for anode 190, are best shown in FIG. 8. Anodes 190 and 191 are semi-circular case lead-tin alloy material ½ inch thick by 6 inches wide by 11 inches in outside diameter. The anode has a composition of from 10% to 15% by weight of tin and from 90% to 85% of lead. In a specific embodiment, the anode is preferably coated with a 2 to 15 mil coating of copper to protect the anode from corrosion by the plating bath, or electrolyte. In this particular phase of the electroplating operation, a lead-tin-copper coating of from .5 to 20 mils thick is superimposed on the diffusion-barrier flash coated concave surface of the semi-circular articles to be plated. The final plate in a specific example has a tin content of from 8–12%, 2% to 3% copper and the balance lead. FIG. 8 shows a side elevation of anode 191 and its semi-circular shape. The free end of 191 is adapted to fit between a pair of jaws 192 and 193 defining a slot 194 in the track 10. Jaws 192 and 193 are provided with lips 195 and 196, respectively, coextensive in length with the width of anode 191, e.g. 6 inches. It has been found that control of the dimensions of the slot 194 and the lips 195 and 196 is necessary in order to insure no more than a 5% variation in the thickness of the coating applied to the semi-cylindrical articles circumferentially therearound. The following dimensional relationships have been found most satisfactory to insure uniform plate thicknesses within the above mentioned limit, and are conveniently expressed as percentages of the diameter of the semi-cylindrical articles being plated:

A=20% to 38%
B=2.5 to 4%
C=6% to 15%

By changing B, we have found that we can control the plate thickness or taper. If B is made smaller, we can cause the thickness to diminish toward the parting line or lateral edges. If B is made larger, the plate thickness can be caused to increase toward the parting line surfaces or lateral edges. With no rib, the plate thickness in the central portion of the shell may be 12% greater than that at the parting line edges.

In order to plate a bearing shell having an I.D. of 2.3 inches, a common automobile crankshaft bearing size, the slot 194 had an A dimension of 0.500 inch; B, .0625 inch and C, 0.250 inch. Similar control can also be obtained by decreasing the A values which increases however, the total resistance in the plating circuit with a corresponding increase in the plating voltage. Plating voltages are in the range of from 20 to 40 volts.

In lieu of adjusting B to control coating thickness in various sectors of the articles being plated, B may be 0.0 and the anode position adjusted along a radius. If the anode is raised above the center line, i.e. closer to the concave surface, a coating thicker in the central section is obtained. The converse is also true.

As indicated above, the anodes 190 and 191 are continuously consumed in the course of the electroplating operation. Accordingly, means are provided for accurately feeding the anodes 190 and 191 into the slots 194. To the accomplishment of this objective, there is provided a cradle 197 which is conveniently formed from the same plastic material used in forming the track 10. Cradle 197 is firmly bolted to track 10 by means of bolts 198. Any suitable means of securing the cradle to the track may be employed. Cradle 197 is provided an arcuate depression or concavity 198 concentric with the semi-cylindrical anode 191. The concave surface of the cradle 197 is provided with a circumferential groove 199, and a plurality of spaced slots 200 adapted to receive a plurality of rollers 201 and journals 202 rotatably mounted in bearings 203, respectively. Rollers 201 are conveniently formed of poly (vinyl chloride) and provided with journals 202. "Teflon" (poly-tetrafluoroethylene) bearings 203 may be employed. This assembly permits the anode 191 to be moved by a driving arm 210 as the anode 191 is consumed in the course of the electroplating operation.

Driving arm 210 is provided with a spur 211 which is adapted to be received by a notch 212 in anode 191. Anode 190 is desirably similarly constructed if a pair of anodes are to be used. Arm 210 rotates about a center which is concentric with the axis of the semi-cylindrical anode 191 and the center of the arcuate depression in the cradle 197. In the case where two anodes are provided, a pair of such arms 210 are provided. As shown more clearly in FIG. 10, a pair of arms 210 are rotatably mounted on a shaft 213 which is journaled for rotation in pillow blocks 214 and 215 mounted upon backing plate 216 which is in turn secured to the track or platform 10. Spring loaded clawclutch members 217 and 218 which are keyed to shaft 213, drive the arms 210 and thus force anodes 190 and 191 into the respective slots 194.

The degree of advancement of the anodes 190 and 191 must be very carefully controlled in order to assure a desired coating. Accordingly, an anode advancing control mechanism is provided, the details of which are more clearly shown in FIGS. 8 and 9. There is here provided a gear 220 mounted on the shaft 213 between the spaced apart arms 210. Rotary motion is imparted to the shaft 213 through the gear 200 by means of a worm gear 221 engaged therewith and carried on shaft 222 disposed perpendicularly to shaft 213. Suitable support means generally shown at 223 and 224 are provided for shaft 222, the distal end of which is journaled for rotation in pillow block 225, and the free end of which carries driven gear 226. Gear 226 is driven by gear 227 keyed to shaft 228 which is journaled for rotation in pillow block 229 and carries on its free end a ratchet wheel 230. Crank arm or jack lever 231 is journaled on shaft 228 for rotation independently of the rotation of shaft 228 at one end, and is connected by means of link 232 to piston rod 233 of air cylinder 234. Spring biased driving pawl 235 is disposed in driving engagement with ratchet wheel 230, and spring biased holding pawl 236 is suitably mounted to hold ratchet wheel 230 in position while driving pawl 235 is being moved by the action of air cylinder 234, piston rod 233, link 232 and jack lever 231. Instead of an air cylinder, an electrically operated solenoid may be used.

In a specific embodiment, gear 220 has 30 teeth and a pitch diameter of 1.875. Worm gear 221 is a .791 pitch diameter, 16 pitch single thread gear. Driven gear 226 is a left-hand, 12 pitch helical gear having 36 teeth and a 3.06 pitch diameter. Driving gear 227 is a right hand 12 pitch helical gear having 18 teeth and a 1.50 pitch diameter. Ratchet wheel 230 has 90 teeth. The former dimensions for the gears involved are merely exemplary, and those skilled in the art will thus be guided in the selection of other gears and ratchets to secure any desired feed rate.

Figure 17:
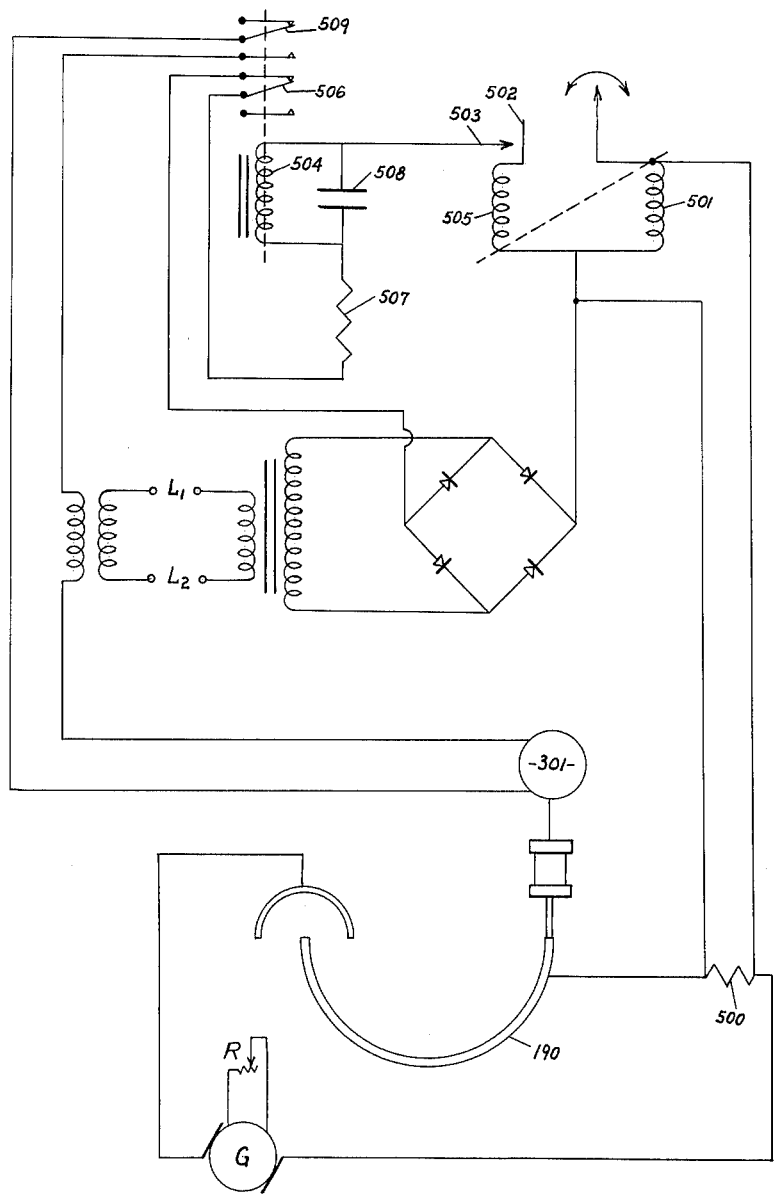
FIG. 17 is an electrical schematic for one form of anode feed control.

In actual operation, the distance D shown in FIG. 8 between the concave surface of the semi-cylindrical article being plated and the anode 191 gradually increases as the anode is corroded away by the electroplating action. As the distance D increases, there is a corresponding change in potential between these two surfaces which can be measured and which can provide the means for controlling the advancement of anodes 190 and 191 into the slot 194. A suitable electrical circuit is shown in FIG. 17 for actuating the anode advancing mechanisms shown in FIGS. 8, 9 and 10. This change in potential can be used as a signal to activate the air cylinder 234 or a solenoid. Timed sensing of the potential across the distance D may also be employed if desired so that adjustment of the anode position in the slot 194 can be corrected as frequently as desired. In a specific embodiment, sensing of the potential across the distance D is made every three seconds. Electrical connections for the anodes 190 and 191 are made at points 240 and 241. Bus bars carried in appropriate slots in tunnel 60 and in sliding contact with the semi-cylindrical articles to be plated provide the pole of opposite polarity to complete the electric circuit for electroplating. In a specific embodiment two negatively chargeable copper bus bars ¼" x 1" x 8" are provided on the 45° and 135° radii of the semi-cylindrical articles and in sliding contact therewith. This is sufficient for all plating areas in the apparatus.

*Flash coating section*

Figure 12:
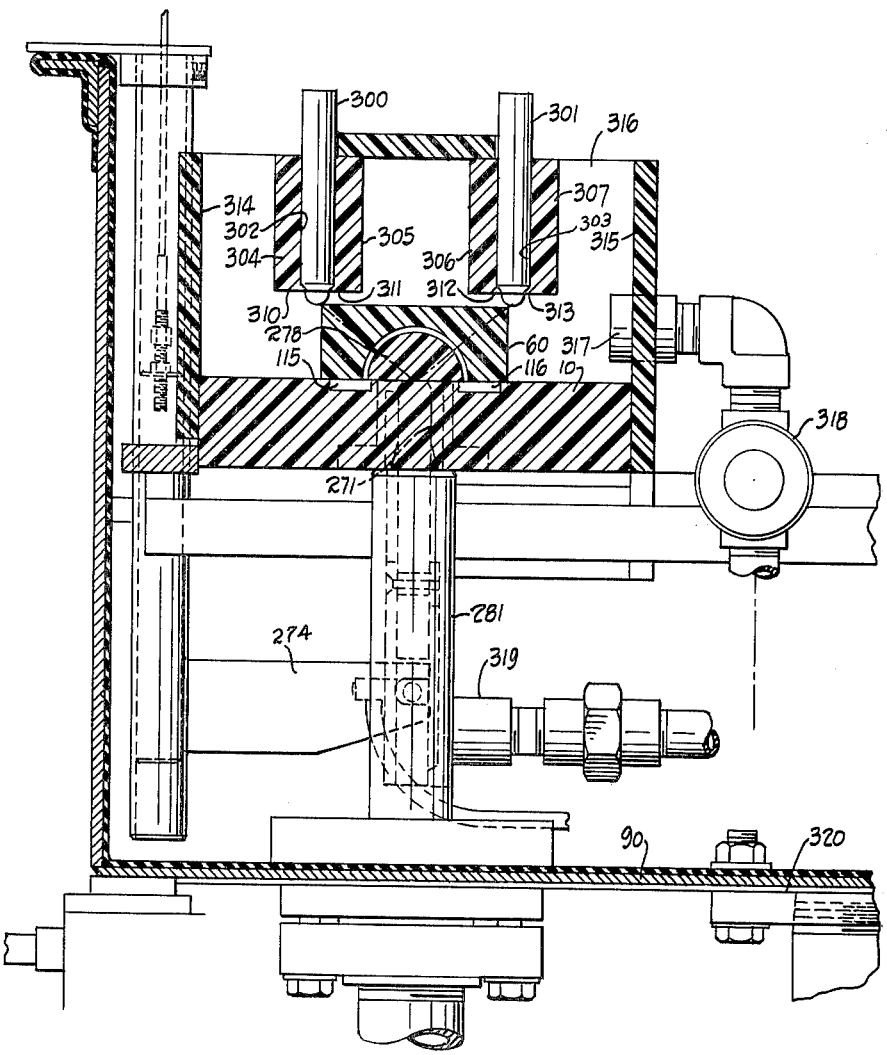
FIG. 12 is a cross-section taken on the line 12—12 of FIG. 11.

Following the application of the alloy coating by apparatus such as described in FIGS. 7, 8, 9 and 10, the semi-cylindrical articles being plated again enter a rinsing section which has the same configuration and structure as previous rinsing sections, the details of which are shown in FIG. 13. Following the rinsing step, the semi-cylindrical articles being plated may, if desired, be given a flash coating on the concave and the convex surfaces to improve the appearance and shelf life of the coated articles to corrosion due to handling and exposure. Details of the final flash coating apparatus are shown in FIGS. 11 and 12.

Referring more particularly to FIG. 11, the direction of travel of the articles is from left to right as in the previous illustrations. There is shown the table 10, the core member 178 which is a continuation of the core member shown in FIG. 7 and the tunnel member which is a continuation of the tunnel member shown in FIG. 7. In general, the structure of the section for applying a very thin (30–70 millionths) coating to the concave surface of the semi-cylindrical articles being coated is substantially the same as the details of the strccture for the application of a nickel flash coating as shown in FIG. 5. Instead of a nickel anode, there is provided a lead-tin anode 270 disposed in a slot 271 shown in dotted lines in FIG. 12. In the same manner as nickel anode 107, lead-tin anode 270 moves in a vertical direction in bracket 271. Current is supplied thereto through jaws 272 and electrical connection 273. Clevis 274 and steel pin 275 piercing support member 276 provide means for raising and lowering the anode 270 substantially in the same manner as shown in FIGS. 5 and 6.

Deflection surfaces 277 and 278 are provided in core member 178 and core member 293 to aid the movement of electrolyte between the anode and the concave surface of the articles being plated. Apertures 279 and 280 in the table 10 provide for outlet and inlet of the electrolyte. Inlet pipe 281 and outlet pipe 282 are provided in substantially the same manner as shown in FIG. 5 and permit the introduction of electrolyte preferably, but not necessarily in a manner counter-current to the line of travel of the articles and under turbulent flow conditions. Inlet pipe 281 is connected with line 49 as shown in FIG. 1 and outlet pipe 282 is connected with return line 46 as shown in FIG. 1. Any suitable means for rendering leak proof the apertures 283 and 284 through the bottom of tank 90 may be provided. In the particular case shown, gaskets 285 and 286 are provided and in combination with packing 287 and 288 and glands 289 and 290 serve to prevent loss of electrolyte which seeps into the electrolyte tank 90 in the course of the operation. Barrier members 291 and 292 serve to prevent the electrolyte from becoming diluted or contaminated with wash water in the adjacent sections.

The application of a coating on the convex surface of the semi-cylindrical articles being coated necessitates the removal of a portion of the tunnel 60 to permit direct access from the anode to the metallic convex surface thereof. Provision of a corresponding core section 293 provides support for the column of articles and prevents substantial amounts of electrolyte from contacting the concave surface.

As shown in FIG. 12, a pair of lead-tin anodes 300 and 301 are provided as a source of electroplate for the convex surface of the semi-cylindrical articles being plated. The coating thickness is also from about 30–70 millionths of an inch. While a single anode may be employed for this purpose, best results are secured by providing a pair of such anodes as shown in FIG. 12, the lower ends of which are substantially equidistant from the axis of the semi-cylindrical articles, and preferably spaced along the 45° and 135° radii, respectively. Anodes 300 and 301 are conveniently supported in slots 302 and 303, respectively, formed by jaws 304 and 305, and 306 and 307, respectively. Jaws 304, 305; and jaws 306 and 307 are conveniently supported in end brackets, such as end brackets 308 and 309 which are conveniently supported in turn on tunnel member 60 adjacent the cut-out section thereof. Jaws 304 and 305 are provided with lips 310 and 311 which serve to retain the anode 300 within the slot 302. In like manner lips 312 and 313 on jaws 306 and 306, respectively, serve to retain anode 301. As the anodes are corroded by the electroplating action, anodes 300 and 301 feed by gravity into the positions substantially as shown in FIG. 12. End plates 308 and 309 in combination with walls 314 and 315 disposed on either side of track 10 provide a chamber 316 into which electrolyte is fed through pipe 317. Rapid circulation of electrolyte between the anode and the convex surface of the articles is not essential in this particular portion of the apparatus, although better plating is achieved if the flow therebetween is turbulent as in the previous sections. Electrolyte is permitted to escape through the clearance 318 between tunnel 60 and the semi-cylindrical articles being coated. As will be pointed out in connection with the description of the water rinse section, air flowing between the tunnel 60, the core 279 and the semi-cylindrical articles being plated serve to force the electrolyte through clearance 318. Supply of electrolyte through pipe 317 is controlled by diaphragm valve 318 in a line which is in turn connected with inlet pipe 381 through T 319. Electrical current is supplied to the anodes by connecting terminals at the top thereof by any suitable means, not shown. As the anodes are eroded, they fall by gravity into the slots 302 and 303, respectively, and are replaced from time to time as needed. Seepage from this section of the apparatus exits therefrom through drain 320 in the bottom of tank 90.

*Washing section*

Figure 14:
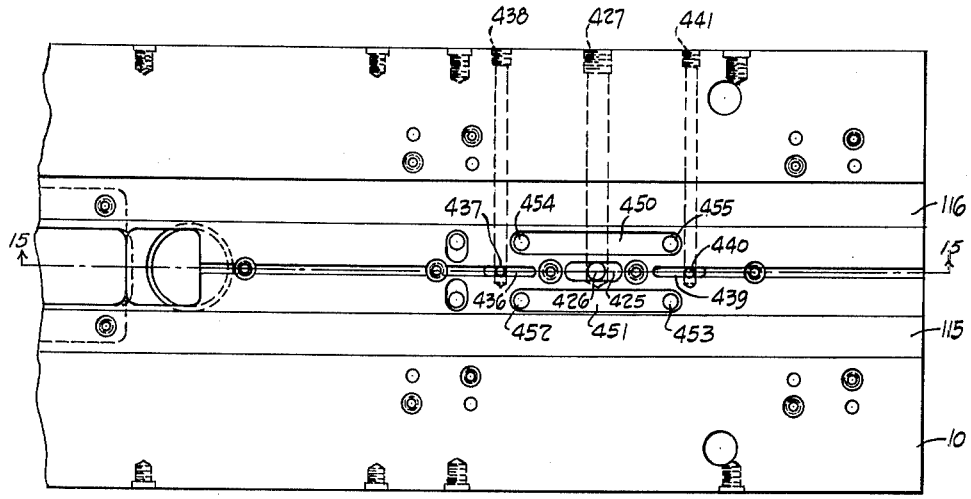
FIG. 14 is a top elevation of a typical section of track adjacent a rinsing section in one form of apparatus in accordance herewith.
Figure 15:
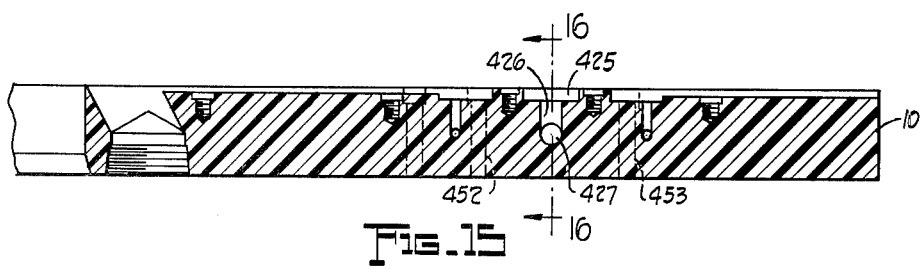
FIG. 15 is a cross-sectional view of the table shown in FIG. 14 taken on the line 15—15 thereof.
Figure 16:
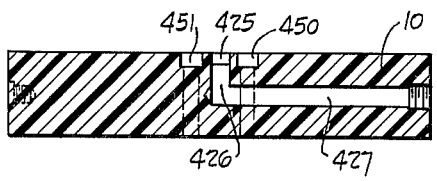
FIG. 16 is a transverse cross-sectional view of the table shown in FIG. 14 taken on the line 16—16 of FIG. 15.

Referring now more particularly to FIGS. 13, 14, 15 and 16, there is here shown the details of a typical washing section or rinsing section in an apparatus in accordance with the present invention. FIG. 13 shows in detail the rinsing section located between the nickel flash section and the alloy plating section, it being understood, however, that the rinsing section shown in FIG. 13 is typical of others employed in the embodiment of the present invention. FIGS. 14, 15 and 16 show the details of the table 10 in the vicinity of a typical rinsing section and the details of a solution inlet pipe for introduction of electrolyte in one of the plating sections.

Essentially, a rinsing section is composed of the tunnel member 60, heretofore referred to, a core section 400 and the table 10. In the section of the tunnel 60 immediately adjacent a rinsing area, the tunnel is modified to provide for the introduction of rinsing water centrally of the section, and gas barriers are provided on either side thereof to prevent escape of the wash or rinsing liquid into the adjacent plating areas. Thus, the concave inner surface of the tunnel 60 is provided with a pair of circumferential grooves 401 and 402 adapted to conduct water over the O.D. of semi-cylindrical articles being plated. Bores 403 and 404 communicate directly with circumferential grooves 401 and 402, respectively, for the purpose of conducting rinsing fluid thereto. Bores 403 and 404 also communicate with header 405 which is in turn supplied with rinsing fluid through inlet 406 in header block 407 mounted on top of tunnel 60.

On either side of circumferential grooves 401 and 402, there are provided additional pairs of circumferential grooves 408 and 409, 410 and 411 on the concave surface at tunnel 60 which are adapted to surround with a gas-liquid interface the semi-cylindrical particles passing in the semi-annular space 412 thereby to prevent escape of rinse liquid from the space therebetween. Circumferential grooves 408, 409, 410 and 411 are supplied with gas under pressure, e.g. air, through bores 413, 414, 415 and 416, pairs of which are in turn connected with recesses 417 and 418 in header block 407. Recesses 417 and 418 are in turn connected together by internal conduit 419 which is in turn connected through bore 420 to a source of gas under pressure. Thus, by supplying gas under pressure on both sides of the rinsing liquid portion defined by semi-circular grooves 401 and 402, the rinsing fluid is confined to this section and is not permitted to co-mingle with the plating liquid in adjacent sections of the apparatus.

In order to provide washing of the concave surface of the articles being plated, the core member 400 is also provided with circumferential grooves 421 and 422 on the convex surface thereof through which rinsing fluid is supplied by means of bores 423 and 424 communicating in turn with header 425. Header 425 is supplied with rinsing fluid, e.g. water, by means of bore 426 and inlet line 427.

As in the case of tunnel member 60, gas barrier means are provided on the core 400 on either side of the rinse liquid inlet portion and include circumferential grooves 428, 429, 430 and 431, respectively, supplied with gas under pressure through bores 432, 433, 434, and 435 communicating therewith. Bores 432 and 433 are supplied by header 436 which receives gas under pressure through inlet bore 437 and inlet line 438. In like manner, header 438 supplies bores 434 and 435 and is in turn supplied by bore 440 and inlet 441 in table 10.

Excess or spent rinse water is collected in recesses 450 and 451 from lateral undercuts on either side of core 400, adjacent the surface of the table 10, and exhausted from the system through drain ports 452, 453, 454 and 455 in table 10.

Core member 400 is shown bolted, as by bolts 456, 457, 458 and 459 to the table 10. As indicated above, core member 400 and the other core members referred to herein are conveniently formed of a polyglycidyl ether resin which may or may not be reinforced with a reinforcing filler such as glass or asbestos fibers. Such a material is particularly suited for use in forming the core members of the present apparatus for the reason that it has great dimensional stability under the conditions of operation and is easily machined to provide proper grooves.

The spent wash water or effluent falls by gravity into a tank 90 below the apparatus.

*Electrolytes*

In general, the electrolytes useful in accordance herewith are aqueous solutions which, for the most part, contain ions in common with those being electrolytically eroded and deposited. They are of the proton donor, or low pH type. The anode contributes metal in ionic form to the electrolyte and it is the solution ions in the electrolyte that are electro-deposited in accordance herewith. Instead of corrodable anodes, we may use insoluble anodes, e.g. lead and a saturated aqueous solution of the material to be deposited on the surface, e.g. a saturated solution of nickel, tin, copper, or the like. We may also electro-polish work pieces in accordance herewith by selection of appropriate electrolytes.

As indicated above, the first electroplating operation is preferably the deposition of a diffusion barrier coating of a metal such as nickel. In place of nickel, we may use iron, copper, brass, or cobalt, all of which serve quite well to prevent the diffusion of tin into the bronze from a subsequently applied pure tin coating or an alloy coating containing tin.

When nickel is used as the diffusion barrier material, the electrolyte desirably has the following chemical composition, it being understood that this specific example is for illustrative purposes, only. Plating baths of other compositions will thus become readily apparent to those skilled in the art.

| | |
|---|---|
| Nickel (calc. as metal) | 70 grams per liter. |
| Chloride ion | 20–35 grams per liter. |
| Sulphate ion | To balance the nickel. |
| Boric acid | 30 grams per liter. |

The foregoing solution has a pH of about 2.3 and is used at a temperature of about 120°–130° F.

Plating will be found to take place in this phase of the operation at a current density of from 300 to 500 amperes per square foot. The plating bath is circulated by means of the pump 36 shown in FIG. 1 at a rate of about 100 gallons per minute. The bearing half shells, e.g. having a 2.3″ I.D. are moved along track 10 at a rate of about 2 feet per minute which for the 6 inch anode confrontation in the nickel flash section provides a plating exposure time of about 15 seconds.

The electrolyte for the alloy coating phase of the process herein described is conveniently of the fluoborate type, a specific example of which has the following composition:

| | | |
|---|---|---|
| Lead (calc. as a metal) | grams per liter | 90–110 |
| Tin (calc. as a metal) | do | 6–10 |
| Copper (calc. as a metal) | do | 1–3 |
| Fluoboric acid | do | 30–50 |
| Boric acid | | Saturated solution |
| Animal hide glue | grams per liter | 0.1–0.5 |
| Resorcinol | do | 3–5 |

This electrolyte has a pH less than 1. The bath is used at 70° to 120° F. and plating is carried out at a current density of 500–1000 a.s.f., e.g., 750 amperes per square foot. The plating bath is circulated by means of pump 42 in FIG. 1 at a high rate of speed on the order of 5 to 40 linear feet per second. Under these conditions turbulent flow conditions prevail and agitation is extreme. Such agitation minimizes the polarization effect and prevents concentration polarization thereby enabling rapid plating at extremely high current densities.

The higher the copper content of the electrolyte, the lower the current density which may be used. Without copper present, one can achieve a current density up to 1200 amperes per square foot. Copper is, however, desirable as a hardener which increases the fatigue resistance of the plated coating.

As indicated above, the final flash coating step is not essential but it is desirable to improve the marketability of the plated articles, particularly semi-cylindrical bearing half shells, and also to prevent corrosion due to exposure in handling. These operations are similar to the nickel plating step. From 30 to 70 millionths of an inch thickness coating are deposited on both the concave and the convex surfaces. The current density is from 200 to 500 amperes per square foot. The plating bath solution in each case for the concave and convex surfaces is the same as the electrolyte for the alloy plating step above described with the exception that there is no copper present. Requisite agitation is provided in the same manner by pumping the electrolyte by means of pump 48 at a rate of about 100 gallons per minute.

Referring more particularly to FIG. 17 there is here shown a schematic diagram illustrating one means for controlling the movement or position of the alloy anode. At the start of the plating operation, the anode will be manually positioned 1/16″ to 1/8″ beneath the upper surface of the slot 194 (FIG. 7). Using the field rheostat, R, the desired plating current will be impressed between the anode and cathode (bearing shells).

As the anode erodes in the course of plating, the resistance between the anode and cathode will increase causing the current to drop. A suitable shunt 500 is connected in the plating circuit, and a portion of the plating current may be fed to the signal coil 501 of a conventional current meter relay schematically shown in FIG. 17. In such a meter relay, the input signal causes the moving element 502 to rotate until it contacts the preset fixed contact 503 closing the circuit through the coil 504 of a load relay. Locking coil 505 provides additional torque to maintain the moving and fixed contacts together. In the arrangement shown, when the load relay pulls in and opens load relay contacts 506, the meter contacts are released. The meter pulses with the load relay so long as the signal acts in a direction to close the meter contacts. A suitable resistance 507 and capacitance 508 network acts to slow the operation of the relay. Thus load relay can also be connected to close the contacts 509 in the exciting circuit to the solenoid which actuates the air cylinder. Thus, the meter relay of FIG. 17 can be coupled to the plating circuit so that the air cylinder will be actuated to feed the anode 190 so long as the current in the plating circuit is below a predetermined operating level. The positioning of the anode by the air cylinder has been previously described above in connection with FIGS. 9 and 10 of the drawings. Such a system has been operated to hold the plating current to an accuracy of ±2%. As the amount of metal deposited per unit of time is directly dependent upon the current, the illustrated circuit is effective to control the variations in thickness of the electrodeposited coating to within tolerances of the same order of magnitude, e.g. ±2%, per unit of time. Of course, line speed and other factors can also influence the ultimate plate thickness.

By moving a column of negatively charged articles to be plated continuously in uniform spaced relation to a replaceable anode, we obtain identical conditions of temperature, static head, velocity, distance between anode and cathode, current density, etc. all of which influence the character of the plate. All articles are thus submitted to identical plating conditions with the result that the $n$th processed article has substantially the same characteristics as the first.

In the course of the electroplating, it will often be found that the electroplate material has bridged between adjacent semi-cylindrical shells and to form a closed chamber to be filled by electrolyte. This has been found to cause no trouble, and in fact aids in maintaining the column of shells uniformly negatively charged. The shells are easily separated for gauging, inspecting, packing, etc.

By reversing the polarity as between the work piece and the anode, deplating, or electro-etching may be effected with the same efficiency as the plating or coating operation herein described.

Other modes of applying the principle of this invention may be employed instead of those specifically set forth above, changes being made as regards the details herein disclosed provided the elements set forth in any of the following claims, or the equivalent of such be employed.

It is, therefore, particularly pointed out and distinctly claimed as the invention:

1. A method of electrochemical treatment of the concave surface of electrically conductive semi-cylindrical articles which comprises the steps of moving a continuous column of such articles relative to an electrode and having the concave surface of such articles in predetermined spaced exposed relation to said electrode, supplying an electrolyte to the space between said articles and said electrode, causing said electrolyte to fill said space and to flow under turbulent flow conditions in said space, maintaining the convex surface of said articles substantially free of electrolyte by confining said electrolyte to the space between the concave surface of the work piece and the electrode, and passing a direct current between the articles and said electrode through said electrolyte.

2. The method of electrochemical treatment of a surface of an electrically conductive work piece, comprising the steps of moving the work piece surface in predetermined spaced relation and relative to an electrode, simultaneously passing a pair of converging streams of an electrolyte through the space between the work piece surface and the electrode, removing the combined streams at a point intermediate their origins, causing each of said streams to flow under turbulent flow conditions confining said electrolyte to the space between the work piece surface and the electrode, and passing a direct current between the work piece surface and the electrode through said electrolyte.

3. A method of electroplating the concave surface of electrically conductive semi-cylindrical articles which comprises the steps of moving a continuous column of such articles relative to an anode and having the concave surface of such articles in predetermined spaced exposed relation to said anode, supplying an electrolyte to the space between said articles and said anode, causing said electrolyte to fill said space and to flow under turbulent flow conditions in said space, maintaining the convex surface of said articles substantially free of electrolyte by confining said electrolyte to the space between the work piece surface and the electrode, and passing a direct current between said articles and said anode through said electrolyte to deposit anode material on the surface of said articles.

4. The method of electrochemical treatment of a surface of an electrically conductive work piece comprising the steps of moving a work piece in spaced relation and relative to an electrode, simultaneously supplying an electrolyte to the space between the work piece surface and the electrode, causing said electrolyte to flow under turbulent flow conditions through said space, confining said electrolyte to the space between the work piece surface and the electrode, selectively controlling the spacing between said electrode and said work piece by determining the electrical potential difference between the electrode and the work piece, comparing said potential with a predetermined operating potential, and adjusting the spacing in response to the compared differences to re-establish the predetermined operating potential, and passing a direct current between the work piece and the electrode through said electrolyte.

5. In an apparatus for the electrochemical treatment of a surface of an electrically conductive work piece, an electrode, means for moving the electrode toward the surface of said work piece, means for supporting said work piece in predetermined substantially constant spaced relation to said electrode, means for moving the work piece past said electrode while maintaining said predetermined substantially constant spaced relation, means for passing an electrolyte through the space between said work piece and said electrode; means coacting with said last named means for agitating said electrolyte as it passes through said space; means for confining the electrolyte to the space between one surface of the work piece and the electrode, and means for passing a direct current between the work piece and the electrode through said electrolyte.

6. In an apparatus for the electrochemical treatment of a surface of an electrically conductive work piece, an electrode, means for supporting said work piece in spaced relation to said electrode, means for moving the work piece past the electrode, means responsive to the change in potential between the surface of said work piece and said electrode for maintaining a predetermined spaced relation therebetween, means for passing an electrolyte through the space between said work piece and said electrode, means coacting with said last named means for causing said electrolyte to flow under turbulent flow conditions as it passes through said space, means for confining said electrolyte to the space between the work piece surface and the electrode, and means for passing a direct current between the work piece and said electrode through said electrolyte.

7. In an apparatus for electrochemical treatment of a continuous columnar section of electrically conductive semi-cylindrical work pieces in abutting end to end relation to each other, electrode means, means for supporting said columnar section of work pieces in spaced relation to said electrode means and with their respective concave surfaces facing said electrode means, means for moving said columnar section of work pieces past said electrode means, means for passing converging streams of electrolyte from opposite ends of said section through the space between said work pieces and said electrode means, means for impressing turbulent flow conditions on each of said streams of electrolyte as it passes through said space, means for confining said electrolyte to the space between the work piece surface and the electrode, means for withdrawing said electrolyte from a point intermediate said opposite ends, and means for passing a direct current between said work pieces and said electrode through said electrolyte.

8. In an apparatus for electroplating a continuous columnar section of electrically conductive semi-cylindrical bearing shells in abutting relation to each other, an elongated table having a plurality of spaced slots longitudinally disposed therein, anodes disposed in each of said slots, drive means for moving said columnar section of bearing shells longitudinally along said table in parallel spaced relation to said anodes, means for guiding said columnar section longitudinally over said anodes and with the respective concave surfaces facing said anodes serially, said columnar section adapted to coact with said table to define a continuous semi-circular cavity over said anodes, means for continuously feeding each of said anodes into said slots, means for passing a stream of electrolyte through the cavity adjacent each of said anodes and in contact with said anode and said concave surfaces and coacting with said continuous semi-circular cavity to confine said electrolyte to the space within said cavity, means for impressing turbulent flow conditions on each of said streams of electrolyte, means coacting with said table for withdrawing each of said streams of electrolyte, and means for passing a direct current between said columnar section and each of said anodes to deposit metal from said electrolyte on said concave surfaces.

9. In an apparatus for electroplating the concave surface of a continuous columnar section of electrically conductive semi-cylindrical bearing shells in abutting relation to each other, an elongated table, a plurality of spaced slots longitudinally disposed in said table, drive means for moving said columnar section of bearing shells longitudinally along said table in parallel spaced relation to said slots, a diffusion barrier metal corrodible anode in one of said slots, means coacting with said anode to maintain a predetermined spaced relation between said concave surface and the surface of said anode, a pair of lead-tin alloy corrodible anodes disposed in the next succeeding slots, means coacting with each of said lead-tin alloy anodes to maintain a predetermined spaced relation between said concave surface and the respective corrodible surfaces of said alloy anodes, means for guiding said columnar section longitudinally over said anodes and with the respective concave surfaces facing the respective anodes serially, said columnar section and said table adapted to coact to define a continuous semi-circular cavity over said anodes, means for feeding said diffusion barrier anode into its respective slot, means for feeding said alloy anodes into their respective slots, means for supplying streams of electrolyte to the semi-circular cavity adjacent each of said slots to contact said anodes, respectively, and adapted to coact with said continuous semi-circular cavity to confine said electrolyte to the space within said cavity, means for impressing turbulent flow conditions on each of said streams, means coacting with said table for withdrawing each of said streams of electrolyte, and means for passing a direct current between said columnar section and each of said anodes through said electrolyte to deposit metal from said anodes on said concave surface.

10. The apparatus of claim 9 including means for washing the surface of said columnar section between said diffusion barrier anode and said lead-tin anodes.

11. The apparatus of claim 9 in which the diffusion barrier anode is rectangular in shape and the means for feeding said diffusion barrier anode into its slot includes guide means for said anode coacting with said slot, and counterweight means coacting with said anode to urge said anode into said slot.

12. The apparatus of claim 9 in which said alloy anodes have a geometric configuration of a segment of a hollow cylinder having a corrodible end and a free end and the means for feeding each of said anodes includes a cradle adapted to support said anode, guide means for said anode coacting with said slot, means coacting with said cradle to permit angular movement of said anode therein, and means coacting with the free end for driving said anode into said slot.

13. The apparatus of claim 12 in which the anode drive means coacts with said means for maintaining a predetermined spaced relation between said concave surface and said alloy anodes.

14. In an apparatus for the continuous electroplating of an electrically conductive work piece having a predetermined geometric configuration having outer and inner surfaces, a washing section comprising an elongated table section, a tunnel member having a groove therein complementary to the geometric configuration of the outer surface of said work piece and adapted to confront said surface, a core member having a surface complementary to the geometric configuration of said inner surface and adapted to confront said surface, said tunnel member and said core member being in superimposed relation and defining a space therebetween adapted to receive said work piece, means in said tunnel member for supplying wash fluid to said outer surface, means in said core member for supplying wash fluid to said inner surface, means for confining the wash fluid within the surface confronting portions of said tunnel member and said core member, respectively, and means for exhausting spent wash fluid from said washing section.

15. An apparatus in accordance with claim 14 in which the confining means includes means for supplying a gas on either side of said wash fluid in both the tunnel member and core member to form gas-wash fluid interfaces located within said surface confronting portions of said tunnel member and core member, respectively.

16. In an apparatus for the continuous electroplating of an electrically conductive work piece, a consumable anode having a geometric configuration of a segment of a hollow cylinder and having a corrodible end and a free end, a cradle adapted to support said anode, means coacting with said cradle to permit angular movement of said anode therein, and means coacting with the free end of said anode for angularly moving said anode.

17. In an apparatus for electroplating a continuous columnar section of electrically conductive semi-cylindrical bearing shells in abutting relation to each other an elongated table having a plurality of spaced slots longitudinally disposed therein, anodes disposed in each of said slots, drive means for moving said columnar section of bearing shells longitudinally along said table in parallel spaced relation to said anodes, means for guiding said columnar section longitudinally over said anodes and with the respective concave surfaces facing said anodes serially, said columnar section adapted to coact with said table to define a continuous semi-circular cavity over said anodes, means for continuously feeding each of said anodes into said slots, means for maintaining a uniform distance between said anodes and said bearing shells, means for passing a stream of electrolyte through the cavity adjacent each of said anodes and in contact with said anode and said concave surfaces, means for impressing turbulent flow conditions on each of said streams of electrolyte, means coacting with said table for withdrawing each of said streams of electrolyte, and means for passing a direct current between said columnar section and each of said anodes to deposit metal from said electrolyte on said concave surfaces.

References Cited by the Examiner
UNITED STATES PATENTS

| | | | |
|---|---|---|---|
| 1,396,919 | 11/1921 | Brace | 204—225 |
| 1,798,391 | 3/1931 | Wurth | 204—26 |
| 2,500,206 | 3/1950 | Schaefer et al. | 204—297 |
| 2,699,424 | 1/1955 | Nieter | 204—15 |
| 2,761,831 | 9/1956 | Luechauer | 204—297 |
| 2,869,266 | 1/1959 | Hirdler | 204—143 |
| 2,944,945 | 7/1960 | Allison | 204—26 |
| 2,944,947 | 7/1960 | Leuchauer | 204—202 |
| 2,971,810 | 2/1961 | Ressler | 346—74 |
| 3,007,854 | 11/1961 | Smith et al. | 204—28 |
| 3,079,308 | 2/1963 | Ramirez et al. | 204—28 |

OTHER REFERENCES

Rodgers: Handbook of Practical Electroplating, MacMillan, New York, 1959.

JOHN H. MACK, *Primary Examiner.*

JOSEPH REBOLD, *Examiner.*